Figures 3, 4:
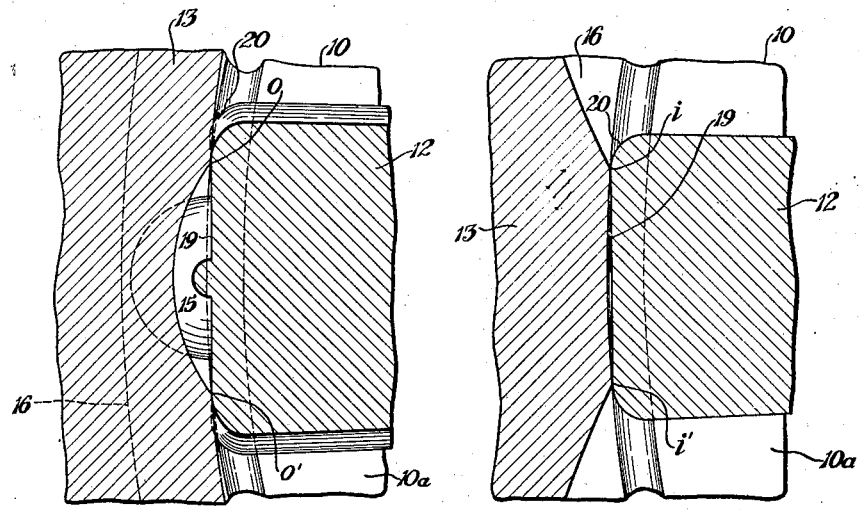

March 29, 1932.    F. TYSON    1,851,551
TAPERED ROLLER BEARING
Filed Dec. 19, 1930    3 Sheets—Sheet 1

Inventor
Frank Tyson
By Frease and Bishop
Attorneys

March 29, 1932.     F. TYSON     1,851,551
TAPERED ROLLER BEARING
Filed Dec. 19, 1930     3 Sheets-Sheet 2

Inventor
*Frank Tyson*
By *Frease and Bishop*
Attorneys

March 29, 1932. F. TYSON 1,851,551
TAPERED ROLLER BEARING
Filed Dec. 19, 1930 3 Sheets-Sheet 3

Inventor
Frank Tyson
By Frease and Bishop
Attorneys

Patented Mar. 29, 1932

1,851,551

UNITED STATES PATENT OFFICE

FRANK TYSON, OF CANTON, OHIO

TAPERED ROLLER BEARING

Application filed December 19, 1930. Serial No. 503,552.

The invention relates to roller bearings and particularly to a construction of tapered roller bearings designed to prevent the rollers from falling away from the cone, and to maintain the rollers in alignment during operation of the bearing, with a minimum amount of resistance and friction between the larger ends of the rollers and a thrust flange.

For many years past roller bearing manufacturers and engineers have been obsessed with the idea that the rollers of tapered roller bearings must be contained in a cage which rotates with the rollers between the cup and cone for the purpose of keeping the axes of the rollers directed to the common apex of all the cones; and, as far as applicant is advised, every tapered roller bearing in commercial use today is provided with a cage of some sort to retain the rollers.

In the operation of such roller bearings there is a continual friction contact between one side or the other of each roller and the adjacent portion of the cage, depending upon the direction of rotation of the bearing.

Tapered rollers in operation in a bearing continually tend to slip out radially, the end thrust causing a continual end friction between the roller and the thrust flange of the bearing, tending to deflect the axis of the roller away from its proper position. The frictional contact between each roller and the cage is thus increased, each roller grinding the adjacent rib or bar of the cage into a longitudinally convex surface upon which the rollers pivot at points intermediate their ends and continually rock back and forth during the operation of the bearing.

Roller bearing engineers have for years endeavored to overcome this slipping, or rocking, of the individual rollers out of alignment, by providing for separated points or surface contacts between the ends of the rollers and the thrust flange. As early as 1885 D. J. Powers in U. S. Patent No. 313,022, of February 24, 1885, disclosed the objections to a two point contact between the ends of the roller and the thrust flange and attempted to overcome the objections thereto; and others early in the art attempted to minimize friction by various methods none of which, to applicant's knowledge, are in practical use today.

In all of the attempts to overcome the objections above referred to it has been found that the contact between the roller and the thrust flange was limited to points, lines or surfaces within the conical locus of the axes of revolution of the rollers; and there was thus no means provided for preventing the individual rollers from falling away from the cone of the bearing.

The object of the present improvement is to provide cageless tapered roller bearings in which the individual rollers are substantially in contact with each other, thus eliminating the friction between the rollers and a cage, and utilizing the proximity of each roller to another to maintain the true axial alignment thereof.

A further, and very important, object of the improvement is to provide a roller bearing of this type in which the rollers contact with the thrust flange outside of the conical locus of the axes of rotation of the rollers, the thrust flange being in the form of a hollow, concave or reentrant cone, thus maintaining the rollers against falling, or being thrown away by centrifugal force, from the cone or inner race.

A still further object is to provide for surface or spot contacts with the thrust flange both inside and outside of the conical locus of the axes of rotation of the rollers, thus maintaining the rollers in proper alignment and preventing the slipping or rocking of the rollers in operation, and reducing the frictional resistance of the thrust flange to a minimum.

The above and other objects, which will appear from an inspection of the accompanying drawings and the following detail description of the invention, may be attained by providing a tapered roller bearing comprising a cone having a reentrant thrust flange in the form of a hollow or concave cone, rigidly connected to the larger end of the bearing cone, each roller preferably having the peripheral edge of its larger flat end rounded as upon a radius, and adapted to contact with the thrust flange at spaced spots or surfaces, both inside and outside of the conical locus of the axes of rotation of the rollers and on opposite sides of a plane through the axes of the bearing and the roller, these spots or surfaces of contact being in the line of tangency between the flat end of the roller and the rounded edge thereof; the rollers being spaced apart only some two-thousandths of an inch so as to be substantially in contact with each other and being retained between the cup and cone without the use of a cage of any description.

Figure 1:
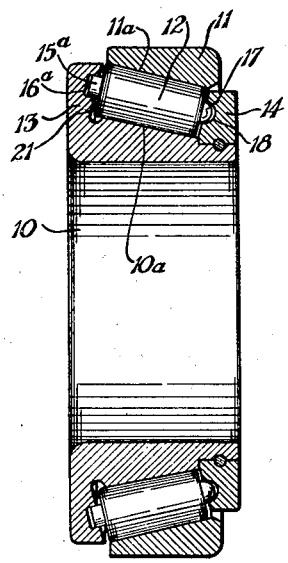
Figure 5:
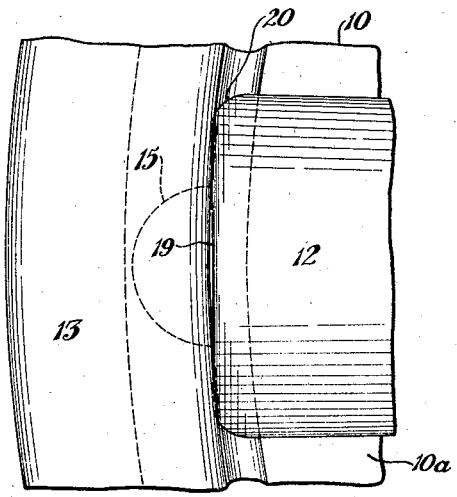
Figure 2:
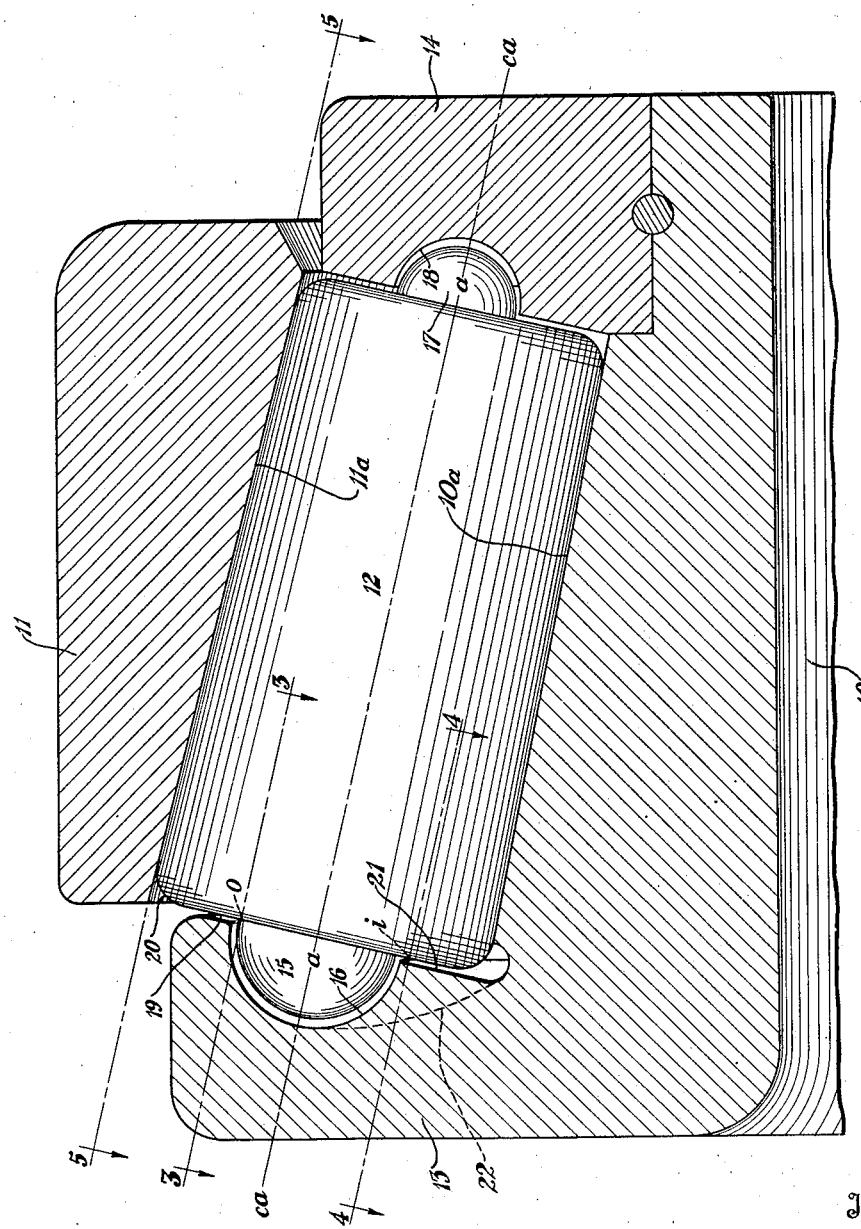
Figure 6:
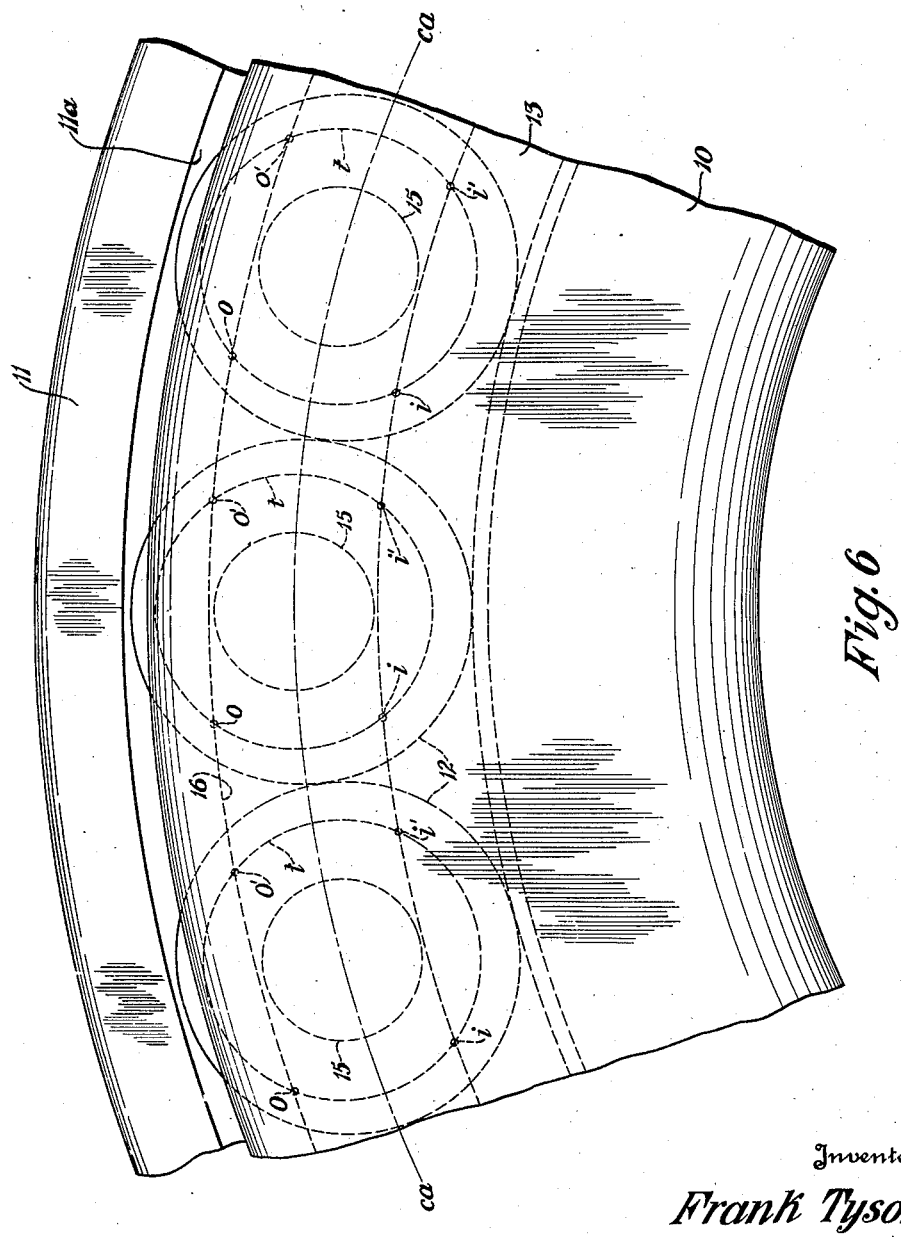

An embodiment of the invention thus briefly described is illustrated in the accompanying drawings, in which Figure 1 is a transverse sectional view through a bearing constructed in accordance with the invention;

Fig. 2, an enlarged transverse section through one side only of the bearing;

Fig. 3, a section on the line 3—3, Fig. 2, taken outside of the conical locus of the axes of rotation of the rollers and showing the contact between the roller and the thrust flange;

Fig. 4, a section on the line 4—4, Fig. 2, taken inside of the conical locus of the axes of rotation of the rollers and showing the contact between the roller and the thrust flange;

Fig. 5, a section on the line 5—5, Fig. 2, showing the roller and thrust flange in elevation; and Fig. 6, a fragmentary end elevation of a portion of the roller bearing.

Similar numerals refer to similar parts throughout the drawings.

The improved roller bearing includes generally the cone 10, cup 11, and rollers 12 mounted for rotation upon and between the inner and outer raceways 11a and 10a respectively of the cup and cone; a thrust or abutment flange 13, in the form of a reentrant or hollow cone being rigidly connected to, or formed integrally with the larger end of the cone 10, and a retaining ring 14 being connected to the smaller end of the cone to retain the rollers assembled upon the cone when the cup is removed.

In order to properly retain the rollers assembled upon the cone each roller is provided at its larger end with a pintle 15 adapted to be received within the annular groove 16 of the thrust flange 13, and the smaller end of each roller may be provided with a pintle 17 to be received within the annular groove 18 in the retaining ring 14.

The larger end of each roller is preferably provided with a flat face 19 and the peripheral edge thereof is curved upon a comparatively small radius, as shown at 20. The flat end face 19, is in a plane perpendicular to the longitudinal axis $a$—$a$ of the roller, and each element of the reentrant or concave cone surface 21 of the thrust flange 13 is preferably located substantially at right angles to an intersecting axis of any of the rollers.

When the flat end 19 of a roller is abutted against the concave conical surface 21 of the thrust flange 13, it will contact with said surface in spots or surfaces, at or adjacent to the edges of the groove 16, on opposite sides of the plane through the axes of the bearing and of the roller, and both inside and outside of the conical locus of the axes of rotation of the rollers, the conical locus of whose trace is indicated by the broken line $ca$—$ca$ in Figs. 2 and 6.

All of the spots or surfaces of contact between the end of a roller and the concave surface of the hollow cone 21 are located in a circle or a circular zone in the end of the roller, spaced at a substantial distance within a circle defining the periphery of the base end of the roller, which inner circle is indicated at $t$ in the end of the roller, and is in the line of tangency between the flat end 19 and the round edge 20 of the roller, which circle $t$ must always be in a plane perpendicular to the axis of the roller.

Thus there are four spots or surfaces of contact, two indicated at $i$—$i'$ being at the inner edge of the groove 16 inside of the conical locus $ca$—$ca$ of the axes of rotation of the rollers, and the other two indicated at $o$—$o'$ being at the outer edge of the groove 16, outside of the conical locus of said axes of rotation; and spots of each set are located on opposite sides of a plane extending through the axis of the bearing and the axis of the roller.

The rollers 12, when assembled in the bearing, are theoretically spaced some two-thousandths of an inch apart, but such a spacing is so slight as to locate the rollers substantially in contact with each other, as a result of which each roller acts to prevent a lateral deflection of the adjacent roller in the locus of its axis of rotation.

The spaced contacts, $o$—$o'$ and $i$—$i'$, of the end of each roller against the hollow cone surface of the thrust flange prevent the rollers from twisting out of proper alignment as the bearing is rotated and hold the axes of the rollers properly aligned during operation of the bearing.

The outer contacts $o$—$o'$, between the ends of the rollers and the thrust flange, outside of the conical locus of the axes of rotation of the rollers prevent the rollers from falling away from the cone 10 and maintain them in the proper rolling contact with the cone at all times.

The rollers are thus, without the use of a cage, held in proper alignment during operation of the bearing, the spaced contacts $i$—$i'$ and $o$—$o'$, between the ends of the rollers and the hollow cone surface of the thrust flange, preventing twisting of the rollers and keeping their axes always directed toward the common apex of the interacting conical surfaces of the bearing.

All of the unnecessary friction, due to the presence of a cage in the bearing, is eliminated, the rollers being normally spaced slightly apart, and in the event that two rollers contact with each other, during the operation of the bearing, it has been found by experience that the rolling contact of two highly polished surfaces develops practically no friction, as compared with the sliding contact of a roller with a rib or bar of a cage, as in ordinary practice.

Moreover, the sliding surface contact of the four spots in the end of the roller against the conical surface of the thrust flange at the edges of the groove therein, as distinguished from the grinding action of a peripheral edge contact of a roller against the edge of a flange, reduces the frictional resistance of the thrust flange against the end of a roller to a minimum.

It is obvious that the frictional resistance may be further reduced by eliminating the two spot or surface contacts inside the axis of each roll, as by enlarging the groove in the thrust flange inward toward the raceway 10a of the bearing cone, as indicated by dotted line 22 in Fig. 2; but it is preferred to provide the four spot contact, because of the greater stability it gives to each roll in the maintenance of its true axial position.

The size and shape of the spot or surface contacts will depend, of course, upon the accuracy of the contour of the abutting surfaces, and if by long use, and the softness of the metal in either one or the other of the abutting surfaces, the wearing of the surface contacts shall extend and elongate the size and shape thereof, even to the extent of merging one spot into another, there will always remain a surface contact outside the locus of the axes of rotation of the rolls, and on both sides of a plane through the axes of the bearing and the roller, so as to constantly maintain the beneficial results of the present improvement.

And finally, the thrust of each roller against the thrust flange outside the locus of its axis of rotation, not only prevents the larger and heavier end of the roller from being thrown outward by centrifugal force, but also tends to press the smaller and lighter end of the roller inward so as to hug the cone raceway of the bearing as against the same centrifugal force, thereby preventing a chattering of the rollers which may otherwise occur in bearings of this type.

In event, however, the length and more particularly the diameter of the bearing and of the tapered rollers therein are so great, and the rotation of the bearing may be so rapid, that the action of centrifugal force overcomes the action of the end thrust of the roller against the thrust flange, as described herein, and tends to throw the roller laterally outward; it is preferred to form the pintle 15a in the form of a cylinder with sides parallel to the axis of the roller and the groove 16a with its outer side at least parallel to the corresponding side of the roller, as illustrated in Fig. 1, so as to positively prevent the larger end of the roller from being thrown outward, and to conserve the end thrust pressure of the roller against the thrust flange, for the function of holding the roller in proper axial alignment and of preventing a chattering of the rollers as described above.

The bearing of the larger end of each roller against the thrust flange, outside of the conical locus of the axes of rotation of the rollers, and especially such a bearing on opposite sides of the plane through the axes of the bearing and the roller, serves to steady the roller against a deflection of its axis in any direction; so that by locating the rollers substantially in contact with each other, the use of a cage for controlling the rollers may be dispensed with, and the bearing will operate with less frictional resistance, and with greater number of bearing contacts than can be done when a cage is used.

The bearing outside of the conical locus of the axes of rotation, prevents the smaller end of the roller from falling outward by gravity, when the axis of the bearing is positioned vertically, and resists a tendency of being thrown outward by centrifugal force, when the bearing is positioned and operated upon a horizontal axis.

Such a resistance is desirable, if not necessary, in a cageless bearing, not only for convenience of assembling before the cup is positioned around the rollers, but more and vitally important, for causing the smaller end of the roller to hug the cone raceway surface during rapid rotation, and preventing a chattering of the rollers resulting from initial and ultimate imperfections in the fit and the adjustment of the parts.

In theory, the surfaces of the conical raceways and the tapered rollers are supposed to be so perfectly made that by an axially directed adjustment of the cup around the rollers upon the cone, there will be a uniform bearing of the rollers from end to end against and throughout the respective raceways; but in practice, it is impossible to make or finish such a perfect formation of the surfaces as will result in such a uniform bearing.

In any event, in the use of a roller bearing, there is always such a wearing or an abrasion of the bearing surfaces, which is never uniform from end to end of the rollers or throughout the conical raceways, because of imperfections in the initial formation of the parts, variations in the hardness and the texture of the metal, or differences in the loads imposed upon different parts of the surfaces;

so that it is impossible to maintain a uniform bearing of each and all of the rolls from end to end thereof against both of the conical raceways, by an adjustment of the cup upon the rollers around the cone.

Even if that were possible, in a roller bearing having a horizontal axis the load is carried by a very few and not exceeding one-third of the upper rollers when the load is imposed upon the cup, and by a very few and not exceeding one-third of the lower rollers, when the load is imposed upon the cone; and because of the inherent resilience of the parts, as well as because of the initial or ultimate imperfections of form or adjustment, the remaining two-thirds of the rollers may be running without much, if any, load or even without much, if any, pressure in the whole or in some part of their length, and are free to vibrate and chatter, or to be deflected laterally from a true alignment, if they are permitted to do so.

Such a vibration and such a deflection cannot be successfully prevented by the presence of laterally spaced end bearings of the rollers against a thrust bearing when the same are located solely inside of the conical locus of rotation of the axes of the rollers; and can only be successfully prevented by providing one or more end bearings outside of the conical locus of the axes of rotation of the rollers, as illustrated and described herein.

Moreover, the absence of a roll controlling cage, and the immediate proximity of the rolls to each other, permits the use of a greater number of rolls in the bearing, with a resulting presence of a greater number of rolls to carry the load in the bearing section or zone; thus eliminating the unnecessary frictional resistance resulting from the use of a cage, and at the same time increasing the number of the supporting contacts of the bearing.

Because of the elimination of unnecessary frictional resistance and the increase in the number of supporting contacts, the improved bearing illustrated and described herein can be rotated more rapidly and during a longer period, with a less resistance and less development of heat, than can be done by any other type of tapered roller bearing in commercial use; and, moreover, it is the only cageless tapered roller bearing in successful commercial use.

I claim:—

1. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface outside of the conical locus of the axes of rotation of the rollers.

2. A tapered roller bearing including a cone having an outer raceway surface, a cup having an inner raceway surface, a plurality of rollers rolling on and between the raceway surfaces and being substantially in contact with each other, and a thrust flange fixed at the larger end of the cone and having an abutment surface, each roller having an end bearing against the abutment surface outside of the conical locus of the axes of rotation of the rollers.

3. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface outside of the conical locus of the axes of rotation of the rollers and on opposite sides of the plane through the axes of the bearing and the roller.

4. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface outside of the conical locus of the axes of rotation of the rollers and the end bearing surface of the roller being in a plane perpendicular to its axis.

5. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface both inside and outside of the conical locus of the axes of rotation of the rollers.

6. A tapered roller bearing including a cone having an outer raceway surface, a cup having an inner raceway surface, a plurality of rollers rolling on and between the raceway surfaces and substantially in contact with each other, and a thrust flange fixed at the larger end of the cone and having an abutment surface, each roller having an end bearing against the abutment surface both inside and outside of the conical locus of the axes of rotation of the rollers.

7. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface both inside and outside of the conical locus of the axes of rotation of the rollers and on opposite sides 8. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface both inside and outside of the conical locus of the axes of rotation of the rollers and the end bearing surfaces of the roller being in a plane perpendicular to its axis.

9. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface at two spaced spots outside of the conical locus of the axes of rotation of the rollers.

10. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the abutment surface at two spaced spots outside of the conical locus of the axes of rotation of the rollers, the spots being on opposite sides of the plane through the axes of the bearing and the roller.

11. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the flange at two spaced spots outside of the conical locus of the axes of rotation of the rollers and at two spaced spots inside of the conical locus of said axes of rotation.

12. A tapered roller bearing including a cone having an outer raceway surface, a cup having an inner raceway surface, a plurality of rollers rolling on and between the raceway surfaces, and a thrust flange fixed at the larger end of the cone and having an abutment surface, each roller having an end bearing against the flange at two spaced spots outside of the conical locus of the axes of rotation of the rollers and at two spaced spots inside of the conical locus of said axes of rotation, the respective spots being on opposite sides of the plane through the axes of the bearing and the roller.

13. A tapered roller bearing including a cone having an outer raceway surface, a cup having an inner raceway surface, a plurality of rollers rolling on and between the raceway surfaces, and a thrust flange fixed at the larger end of the cone and having a concave cone surface provided with an annular groove, each roller having an end bearing against the flange at each side of the groove, the same being respectively outside and inside of the locus of the axes of rotation of the rollers.

14. A tapered roller bearing including a cone having an outer raceway surface, a cup having an inner raceway surface, a plurality of rollers rolling on and between the raceway surfaces, and a thrust flange fixed at the larger end of the cone and having a concave cone surface with each element at right angles to an intersecting axis of any of the rollers, and provided with an annular groove, each roller having an end bearing against the flange at each side of the groove, the same being respectively outside and inside of the locus of the axes of rotation of the rollers.

15. A tapered roller bearing including a cone having an outer raceway surface, a cup having an inner raceway surface, a plurality of rollers rolling on and between the raceway surfaces, and a thrust flange fixed at the larger end of the cone and having a concave cone surface provided with an annular groove, each roller having an end bearing against the flange at each side of the groove, the same being respectively outside and inside of the locus of the axes of rotation of the rollers, and the end bearing surface of the roll being in a plane perpendicular to its axis.

16. A tapered roller bearing including a cone having an outer raceway surface, a cup having an inner raceway surface, a plurality of rollers rolling on and between the raceway surfaces, and a thrust flange fixed at the larger end of the cone and having a concave cone surface with each element at right angles to the intersecting axes of any of the rollers and provided with an annular groove, each roller having an end bearing against the flange at each side of the groove, the same being respectively outside and inside of the locus of the axes of rotation of the rollers, and the end bearing surface of the roll being in a plane perpendicular to its axis.

17. A tapered roller bearing including a cone having an outer raceway surface, a cup having an inner raceway surface, a plurality of rollers rolling on and between the raceway surfaces, and a thrust flange fixed at the larger end of the cone and having a concave cone surface provided with an annular groove, each roller having an end bearing against the flange at each side of the groove and on both sides of the plane through the axes of the bearing and the roller.

18. A tapered roller bearing including a cone having an outer raceway surface, a cup having an inner raceway surface, a plurality of rollers rolling on and between the raceway surfaces, and a thrust flange fixed at the larger end of the cone and having a concave cone surface provided with an annular groove, each roller having an end bearing against the concave cone surface at two spaced spots at each side of the groove.

19. A tapered roller bearing including a cone having an outer raceway surface, a cup having an inner raceway surface, a plurality of rollers rolling on and between the raceway surfaces, and a thrust flange fixed at the larger end of the cone and having a concave cone surface provided with an annular groove, each roller having an end bearing against the concave cone surface at two spaced spots at each side of the groove, the respective spots being on opposite sides of the plane through the axes of the bearing and the roller.

20. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having an abutment surface, each roller having an end bearing against the abutment surface in the line of tangency of its flat end and the rounded edge and outside of the conical locus of the axes of rotation of the rollers.

21. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having an abutment surface, each roller having an end bearing against the abutment surface in the line of tangency of its flat end and the rounded edge and outside of the conical locus of the axes of rotation of the rollers and on both sides of the plane through the axes of the bearing and the roller.

22. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having an abutment surface, each roller having an end bearing against the abutment surface in the line of tangency of its flat end and rounded edge both inside and outside of the conical locus of the axes of rotation of the rollers.

23. A tapered roller bearing including a cone having an outer raceway surface, a cup having an inner raceway surface, a plurality of rollers rolling on and between the raceway surface, each roller having a flat end perpendicular to its axis and having a rounded peripheral edge, and a thrust flange fixed at the larger end of the cone and having an abutment surface, each roller having an end bearing against the abutment surface in the line of tangency of its flat end and rounded edge both inside and outside of the conical locus of the axes of rotation of the rollers and on opposite sides of the plane through the axes of the bearing and the roller.

24. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone, and having an abutment surface, each roller having an end bearing against the abutment surface in the line of tangency of its flat end and rounded edge at two spaced spots outside of the conical locus of the axes of rotation of the rollers.

25. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone, and having an abutment surface, each roller having an end bearing against the abutment surface in the line of tangency of its flat end and rounded edge at two spaced spots outside of the conical locus of the axes of rotation of the rollers and on opposite sides of the plane through the axes of the bearing and the roller.

26. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having an abutment surface, each roller having an end bearing against the abutment surface in the line of tangency of its flat end and rounded edge at two spaced spots outside of the conical locus of the axes of rotation of the rollers and at two spaced spots inside of the conical locus of said axes.

27. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having an abutment surface, each roller having an end bearing against the abutment surface in the line of tangency of its flat end and rounded edge at two spaced spots outside of the conical locus of the axes of rotation of the rollers and at two spaced spots inside of the conical locus of said axes, the respective spots being on opposite sides of the plane through the axes of the bearing and the roller.

28. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having a concave cone surface with each element at right angles to the intersecting axes of any of the rollers and being provided with an annular groove, each roller having an end bearing against the concave surface at each side of the groove in the line of tangency of the flat end of the roller and the rounded edge thereof.

29. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having a concave cone surface with each element at right angles to the intersecting axes of any of the rollers and being provided with an annular groove, each roller having an end bearing against the concave surface at each side of the groove in the line of tangency of the flat end of the roller and the rounded edge thereof and on opposite sides of the plane through the axes of the bearing and the roller.

30. A tapered roller bearing including a cone having an outer raceway surface, a cup having an inner raceway surface, a plurality of rollers rolling on and between the raceway surfaces, each roller having a flat end perpendicular to its axis and having a rounded peripheral edge, and a thrust flange fixed at the larger end of the cone and having a concave cone surface with each element at right angles to an intersecting axis of any of the rollers and being provided with an annular groove, each roller having an end bearing against the concave surface at two spaced spots at each side of the groove in the line of tangency of the flat face of the roller and the rounded edge thereof.

31. A tapered roller bearing including a cone having an outer raceway surface, a cup having an inner raceway surface, a plurality of rollers rolling on and between the raceway surfaces, each roller having a flat end perpendicular to the axis of the roller and being provided with a rounded peripheral edge, and a thrust flange fixed at the larger end of the cone and having a concave cone surface with each element at right angles to an intersecting axis of any of the rollers and being provided with an annular groove, each roller having an end bearing against the concave surface at two spaced spots at each side of the groove in the line of tangency of the flat face of the roller and the rounded edge thereof, the respective spots being on opposite sides of the plane through the axes of the bearing and the roller.

32. A tapered roller bearing including a cone having an outer raceway surface, a cup having an inner raceway surface, a plurality of rollers rolling on and between the raceway surfaces and being substantially in contact with each other, each roller having axial pintles on its ends, a thrust flange fixed on the larger end of the cone and a retaining ring mounted on the smaller end of the cone, the flange and the ring each having a groove in which the roller pintles are located, whereby each roller has an end bearing against the thrust ring both outside and inside of the conical locus of the axes of rotation of the rollers and the rollers are retained on the cone.

33. A tapered roller bearing including a cone having an outer raceway surface, a cup having an inner raceway surface and a plurality of rollers rolling on and between the raceway surfaces, and being substantially in contact with each other, each roller having an axial pintle on one end, a thrust flange fixed on the larger end of the cone, and having a groove in which the roller pintles are located, whereby each roller has an end bearing against the thrust flange both outside and inside of the conical locus of the axes of rotation of the rollers.

34. A tapered roller bearing including a cone having an outer raceway surface, a cup having an inner raceway surface, and a plurality of rollers rolling in and between the raceway surfaces, each roller having an axial pintle on one end, a thrust flange fixed on the larger end of the cone and having a groove in which the roller pintles are located whereby each roller has an end bearing against the thrust flange both outside and inside of the conical locus of the axes of rotation of the rollers.

35. A tapered roller bearing including a cone having an outer raceway surface, a cup having an inner raceway surface, and a plurality of rollers rolling in and between the raceway surfaces, each roller having a cylindric axial pintle on its larger end, a thrust flange fixed on the larger end of the cone, and having a groove with its outer side parallel to the corresponding side of the pintle, in which groove the roller pintles are located, whereby each roller has an end bearing against the thrust flange outside of the conical locus of the axes of rotation of the rollers and the larger ends of the rollers are held from being thrown outward.

36. A roller bearing including a cone having an outer raceway surface, a cup having an inner raceway surface, and a plurality of roller members rolling on and between the raceway surfaces, each roller having on an axial pintle at one end, a retaining ring having an annular groove in which the pintles are located, whereby each roller has an end bearing against the retaining ring at points both outside and inside of the conical axis of rotation.

In testimony that I claim the above I have hereunto subscribed my name.

FRANK TYSON.